C. A. WAKEFIELD.

Improvement in Lubricating Arrangements for Axles of Wagons.

No. 115,914.                                    Patented June 13, 1871.

UNITED STATES PATENT OFFICE.

CHARLES A. WAKEFIELD, OF PITTSFIELD, MASSACHUSETTS.

IMPROVEMENT IN LUBRICATING ARRANGEMENTS FOR AXLES OF WAGONS.

Specification forming part of Letters Patent No. 115,914, dated June 13, 1871.

*To all whom it may concern:*

Be it known that I, CHARLES A. WAKEFIELD, of Pittsfield, in the county of Berkshire and State of Massachusetts, have invented a new and useful Improvement in Lubricating Arrangements for Axles of Wagons and other vehicles, of which the following is a full, clear, and exact description, reference being had to the accompanying drawing forming part of this specification, and in which—

Figure 1:
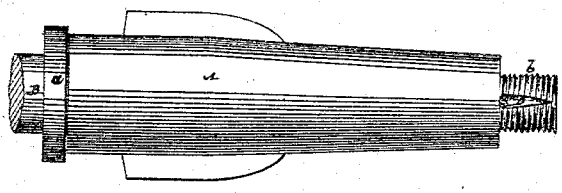
Figure 2:
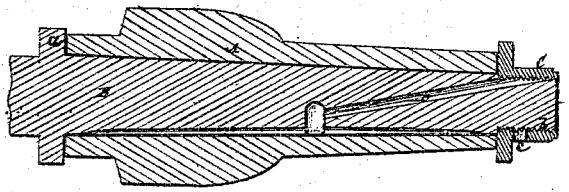

Figure 1 represents a top view or plan of a wagon-axle with the axle-box thereon, but with the nut which holds the latter on the axle removed. Fig. 2 is a vertical longitudinal section of the same with the nut in its place.

Similar letters of reference indicate corresponding parts in both figures.

My invention relates to arrangements for supplying lubricating material to the axles of wagons and other vehicles at will, as contradistinguished from an automatic supply; and the invention consists in a lubricating hole or passage, arranged to start in the screw-thread at the end of the axle on its top, close to the outer end of the axle-box, and made to pass downward, preferably in an oblique direction, longitudinally through the axle to its bottom, at a point intermediate of the length of the axle, in combination with a perforated nut on the end of the axle, with the perforation in it so arranged that, by only slightly unscrewing the nut, the hole in it is brought over the mouth of the supply or lubricating passage in the axle, and on tightening up the nut is adjusted out of line therewith, and preferably made to occupy an under position, whereby dirt is excluded from getting into the axle, and the nut is made to operate as a valve to open and close ingress to the passage through the axle.

Referring to the accompanying drawing, A represents the axle-box of a wagon or other vehicle, and B the stationary axle on which the box, when fitted in the hub of the wheel, works, said axle being formed with the usual inner collar $a$ and outer screw portion or end $b$, on which latter the nut C, that holds the wheel on the axle, is screwed. D is the hole or passage by which the oil or lubricating material is supplied to the box. This passage is made in the stationary axle, and is arranged to start in the top or upper portion of the screw-thread $b$ at the outer end of the axle, whereby the oil may be introduced from the interior of the wheel and at a fixed point. Said lubricating hole or passage, having its mouth thus arranged close to the root of the screw at the outer end of the axle-box, is then run obliquely downward in a longitudinal direction through the axle to or toward its bottom, at a point intermediate of the length of the axle, where, if desired, it is made to connect with a longitudinal groove or annular depression in the axle, to assist in the distribution of the oil, and to prevent the choking of the delivery end of the hole or passage with clotted grease or other matter. This arrangement of the passage D at once forms a simple, efficient, and rapid or convenient means for effecting the lubrication of the axle and its box. To further improve the same, however, I make a perforation, $c$, in or through the one side of the nut C, and so arrange said perforation that, on slightly unscrewing the nut, the perforation is brought over or in line with the mouth of the passage D, whereby oil may be supplied to the axle without taking off the nut; and on tightening up or screwing the nut home the nut is made to close, as a valve, the mouth of the passage D, to the exclusion of dust or dirt, and the perforation $c$ caused to occupy an under position, so that dirt getting in will drop or be shaken out of it.

What is here claimed, and desired to be secured by Letters Patent, is—

An axle having a perforation, D, starting in the screw-thread $b$ at its outer end and upper side, and extending downwardly to near its mid-length, in combination with the nut C having perforation $c$, arranged for operation substantially as specified.

CHAS. A. WAKEFIELD.

Witnesses:
 FRED. HAYNES,
 FERD. TUSCH.